(12) United States Patent
Prohofsky et al.

(10) Patent No.: US 9,027,900 B2
(45) Date of Patent: May 12, 2015

(54) UNIVERSAL BIPOD MOUNT FOR PERSONAL DIGITAL ASSISTANTS

(71) Applicant: Thomas R. Prohofsky, Edina, MN (US)

(72) Inventors: Thomas R. Prohofsky, Edina, MN (US); LeRoy A. Prohofsky, Eden Prairie, MN (US)

(73) Assignee: Thomas R. Prohofsky, Edina, MN (US)

( * ) Notice: Subject to any disclaimer, the term of this patent is extended or adjusted under 35 U.S.C. 154(b) by 0 days.

(21) Appl. No.: 14/153,200

(22) Filed: Jan. 13, 2014

(65) Prior Publication Data

US 2014/0203152 A1  Jul. 24, 2014

Related U.S. Application Data

(60) Provisional application No. 61/754,564, filed on Jan. 19, 2013.

(51) Int. Cl.
| | |
|---|---|
| *A47B 97/04* | (2006.01) |
| *F16M 11/04* | (2006.01) |
| *F16M 11/20* | (2006.01) |
| *F16M 11/38* | (2006.01) |
| *F16M 13/00* | (2006.01) |
| *F16M 13/02* | (2006.01) |
| *H04M 1/21* | (2006.01) |

(52) U.S. Cl.
CPC ............ *F16M 11/041* (2013.01); *F16M 11/046* (2013.01); *F16M 11/2021* (2013.01); *F16M 11/38* (2013.01); *F16M 13/00* (2013.01); *F16M 13/022* (2013.01); *H04M 1/21* (2013.01); *Y10S 248/917* (2013.01); *Y10S 248/923* (2013.01)

(58) Field of Classification Search
CPC .............. F16M 11/041; F16M 11/046; F16M 11/2021; F16M 11/38; F16M 13/00; F16M 13/022; H04M 1/21; A47B 97/04

USPC ........... 248/166, 188.7, 441.1, 445, 449, 460, 248/462, 463, 917, 919, 922, 923

See application file for complete search history.

(56) References Cited

U.S. PATENT DOCUMENTS

| | | | | |
|---|---|---|---|---|
| 278,116 | A | * | 5/1883 | Fisher .......................... 248/449 |
| 1,782,118 | A | * | 11/1930 | Cahall .......................... 248/449 |
| 3,370,821 | A | * | 2/1968 | Mingis .......................... 248/452 |
| 3,759,482 | A | * | 9/1973 | Wright .......................... 248/449 |
| 4,690,363 | A | * | 9/1987 | Koves .......................... 248/449 |
| 5,205,526 | A | * | 4/1993 | Deutsch ....................... 248/449 |
| 5,624,097 | A | * | 4/1997 | Potter .......................... 248/464 |
| 7,380,765 | B2 | * | 6/2008 | Shiff ............................. 248/448 |
| 8,424,825 | B2 | | 4/2013 | Somuah |
| 8,651,446 | B2 | | 2/2014 | Lausell |
| 2011/0315733 | A1 | | 12/2011 | White |
| 2012/0119047 | A1 | | 5/2012 | Lumpkin et al. |
| 2012/0205503 | A1 | | 8/2012 | Kobal |
| 2013/0009024 | A1 | | 1/2013 | Liu |
| 2013/0134291 | A1 | | 5/2013 | Le Gette et al. |
| 2013/0233986 | A1 | | 9/2013 | Rasheta |
| 2013/0256478 | A1 | | 10/2013 | Reda et al. |

* cited by examiner

*Primary Examiner* — Gwendolyn W Baxter
(74) *Attorney, Agent, or Firm* — Nikolai & Mersereau, P.A.; Thomas J. Nikolai

(57) ABSTRACT

A bipod mount for positioning a PDA device for ease of use by a recumbent person comprises a rigid post with slidably adjustable clamping jaws thereon for engaging upper and lower edges of the PDA device. The rigid post is held in a structure including a pair of friction hubs affixed to upper ends of a pair of arms that can be splayed due to the use of the friction hubs. At the second end of the arms are pivotably mounted foot members. The assembly is collapsible to a small size for storage.

9 Claims, 7 Drawing Sheets

UNIVERSAL BIPOD MOUNT FOR PERSONAL DIGITAL ASSISTANTS

CROSS REFERENCE TO RELATED APPLICATION

This application claims priority to U.S. provisional application, Ser. No. 61/754,564, filed Jan. 19, 2013, the contents of which are hereby incorporated by reference

BACKGROUND OF THE INVENTION

Field of the Invention

The present invention relates to adjustable mounts for positioning a user interactive device, particularly an electronic tablet, in an orientation optimal for viewing by users sharing a diverse range of anatomical and postural differences.

TABLE A

| Item | Style | Manufacturer | Vendor | Link |
|------|-------|--------------|--------|------|
| 1 | Bi-Pod | iCraze | Sears | http://www.sears.com/icraze-for-ipad-adjustable-vented-laid-back-tablet/p-SPM1769444214?prdNo=15&blockNo=15&blockType=G15 |
| 2 | Clamp Gooseneck | ChargerCity | Amazon | http://www.amazon.com/ChargerCity-7-8-9-10-Inch-Aluminum-Easy-Adjustable-Gooseneck/dp/B0062RTQAK |
| 3 | Clamp Swing Arm | | Ali Express | http://www.aliexpress.com/item/free-shipping-universal-bed-Holder-360-degree-for-ipad-1-2-3-4-ipad-mini-7/1411007530.html |
| 4 | Clamp Swing Arm | | Ali Express | http://www.aliexpress.com/item/Metal-Multi-functional-Bracket-Foldable-Holder-360-degree-rotation-Stand-for-ipad-PC-Tablet-Car-Bed/930215147.html |
| 5 | Crossbar A-Frame | | DIYTrade | http://www.diytrade.com/china/pd/10465242/World__No__1__designed__hot__sale__Bed__Stand__for__Tablet__PC__Bed__Stand__for__iPad__Holder.html |
| 6 | Crossbar A-Frame | Sanwa | House of Japan | http://www.houseofjapan.com/electronics/sanwa-versatile-tablet-stand |
| 7 | Flexible Quad Leg | Lapdawg | Lapdawg | http://www.lapdawg.com/lapdawg-ostand.html |
| 8 | Floor Stand | | LapWorks | http://www.laptopdesk.net/carbon-steel-ipad-tablet-mount.html |
| 9 | Floor Stand | | | http://www.formengifts.com/adjustable-ipad-tablet-stand/# |
| 10 | Floor Stand | AirDesk | | http://www.airdesks.com/tablet-stand.asp |
| 11 | Folding Prop | | MobiCity | http://www.mobicity.com.au/mobile-stand-for-tablet-pc-such-as-ipad-galaxy-tab-xoom-etc.html#.UrJf3eL7v3l |
| 12 | Folding Prop | Griffn | | http://griffintechnology.com/blog/griffin-gear/all-tablets-must-stand/ |
| 13 | Folding Table | | ebay | http://www.ebay.com/itm/portable-folding-LAPTOP-TABLE-desk-stand-bed-tray-for-notebook-tablet-pc-ipad-/150854912751 |
| 14 | Folding Table | | Ali Express | http://www.aliexpress.com/item/folding-table-Laptop-using-on-bed-Book-Stand-Aluminum-foldable-laptop-desk-bed-tray-laptop-bed/547451206.html |
| 15 | Pillow Prop | iprop | Amazon | http://www.amazon.com/Universal-Android-Windows-Tablets-eReaders/dp/B004W697ES |
| 16 | Quad Leg | nbryte | nbryte | http://www.nbryte.com/products/tablift |
| 17 | Tilt Pedestal | Dev Design 2.0 | | http://www.dsgnwrld.com/the-arm-the-ultimate-stand-for-any-tablet-16888/ |
| 18 | Weighted Gooseneck | XFLEX | XFLEX | http://xflexstand.com/products/xflex-ipad-stand |
| 19 | Weighted Gooseneck | | White Rabbit Japan | http://whiterabbitexpress.com/wriggle-tablet-stand-thanko/ |

An example of each known style of electronic tablet mount is provided in Table A. Of these, the bipod tilt tray style manufactured by iCraze is believed to be the most relevant. It employs two sets of erectable beams, each set connected to one side of an intervening tray making it partially collapsible. The iCraze beams, however, do not achieve the predetermined erect configuration essential to the present invention if, as presumed, the erect configuration is varied to adjust the height of the tray. Alternatively, if the erect configuration of these beams is invariant, then an adjustment necessary for optimal viewing is missing.

The crossbar A-frame style manufactured by Sanwa achieves the highest degree of collapsibility and adjustability found in the prior art by employing four telescopic legs to support the span of a horizontal crossbar over a recumbent user, however this solution compromises usability. Set up or adjustment requires that each telescopic joint involved be separately manipulated. The remaining references in Table A show various compromises made between simplicity, functionality and collapsibility. None of the references show a mount convertible from a compact storage configuration to a predetermined erect configuration, an important advantage of the present invention.

SUMMARY OF THE INVENTION

An apparatus for supporting and positioning an interactive electronic device, also generically referred to herein as a PDA or tablet computer, relative to a user. It may comprise a rigid post including positionable clamps thereon for releasably securing the device to the post, the post being pivotally secured to a pair of frictional hinges disposed on first ends of a pair of legs where the frictional hinges permit tilting of the post with respect to the pair of legs. First and second foot members are hinged to second ends of the pair of legs where the hinges are capable of holding the foot members at a predetermined angle with respect to the legs to which they are attached, but can be released to collapse the feet against the legs during storage.

In its erect state, an interactive electronic device, such as an iPad® or Kindle®, can be positioned to best suit an individual user but can be collapsed to occupy only a relatively small space.

DESCRIPTION OF THE DRAWINGS

The foregoing features, objects and advantages of the invention will become apparent to those skilled in the art from the following detailed description of a preferred embodiment, especially when considered in conjunction with the accompanying drawings in which like numerals in the several views refer to corresponding parts.

DESCRIPTION OF THE PREFERRED EMBODIMENT

Figure 1:
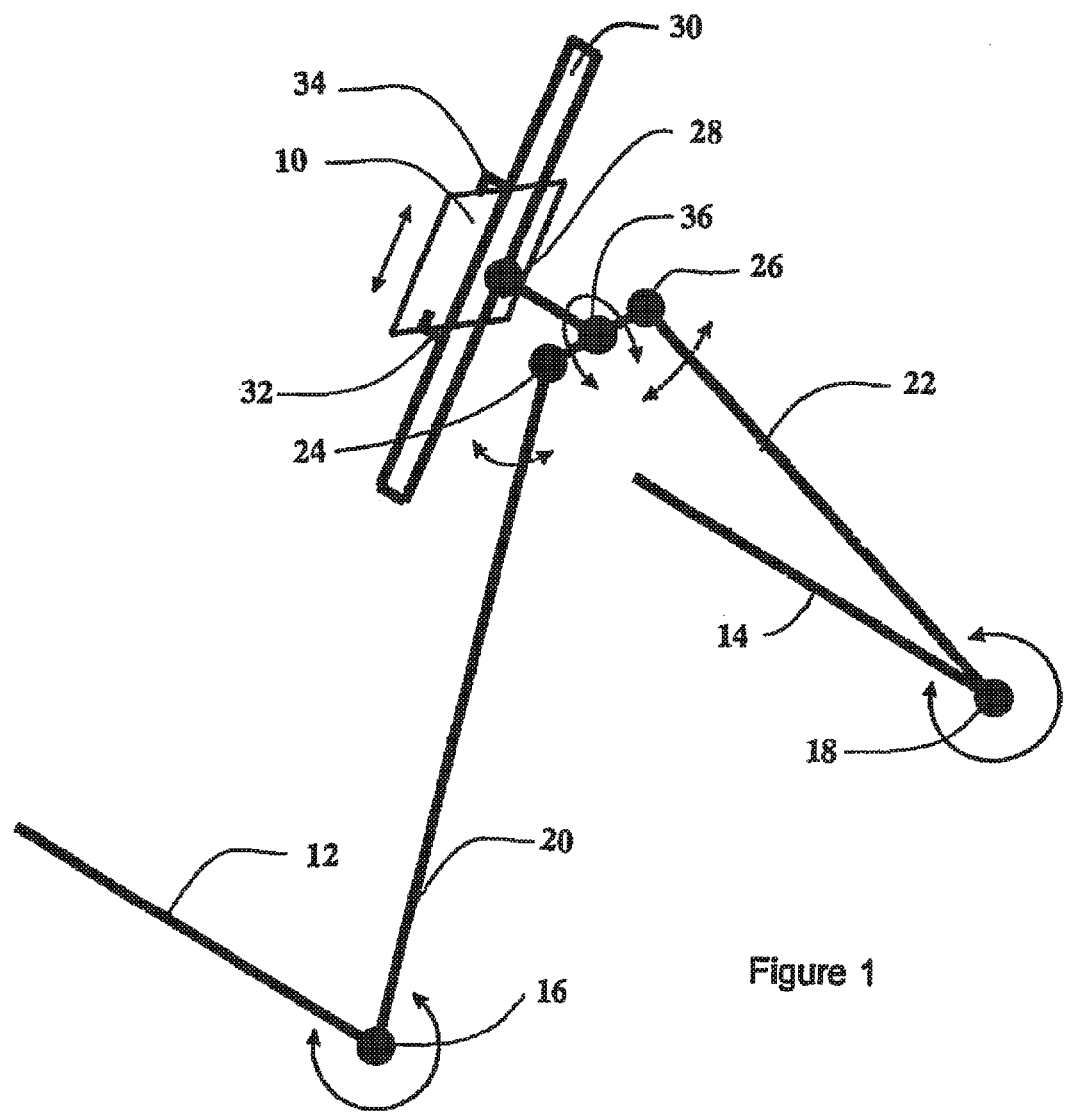
FIG. 1 is a schematic diagram of the elements of the invention that collectively function to mount PDA 10.

This description of the preferred embodiment is intended to be read in connection with the accompanying drawings, which are to be considered part of the entire written description of this invention. In the description, relative terms such as "lower", "upper", "horizontal", "vertical", "above", "below", "up", "down", "top" and "bottom" as well as derivatives thereof (e.g., "horizontally", "downwardly", "upwardly", etc.) should be construed to refer to the orientation as then described or as shown in the drawings under discussion. These relative terms are for convenience of description and do not require that the apparatus be constructed or operated in a particular orientation. Terms such as "connected", "connecting", "attached", "attaching", "join" and "joining" are used interchangeably and refer to one structure or surface being secured to another structure or surface or integrally fabricated in one piece, unless expressively described otherwise.

FIG. 1 is a schematic diagram of the elements of the invention that collectively function to mount a user interactive electronic device such as a personal digital assistant or PDA 10. The actual structure of these schematic elements will be described in subsequent detail. FIG. 1 shows a bipod mount configured to straddle the hips of a recumbent user to which any PDA may be mounted and adjusted to the position preferred by a specific user in a specific recumbent position. PDA 10 is indicative of the gamut of PDAs that includes e-readers, cell phones and digital tablets. The heavy lines indicate the position of the rigid structural elements of the mount while the dark circles indicate the coupling nodes that make the mount both adjustable and collapsible. Feet 12 and 14 resting on a bed (not shown) provide a stable base for the mount. Nodes 16 and 18 indicate hinges that couple feet 12 and 14 to legs 20 and 22, respectively. These hinges, when deployed as shown in FIG. 1, lock to maintain a fixed angle of approximately 80 degrees between the feet and the legs. Each foot is rotatable to a position parallel to its respective leg for storage. Nodes 24 and 26 indicate frictional hinges that allow the mount straddle to vary according to the physiology and preference of the user. The degree of friction of these hinges may be adjusted to a level high enough to maintain a fixed straddle when deployed or to a lower level sufficient to allow legs 20 and 22 to move to the parallel storage position. Node 28 indicates a pair of moveable jaws that clamp to one edge of post 30 to adjust and secure the elevation of PDA 10. Post 30 is detachable from the jaws of node 28 and be inverted upon re-insertion. Jaws 32 and 34 are moveable along a second edge of post 30 to adjust and secure PDAs of varying height to post 30. Node 36 indicates a frictional and rotational joint that provides an axis of rotation to vary the pitch of PDA 10. During setup the user rotates joint 36 to the preferred degree of pitch and applies a transverse compressive force to joint 36 to lock PDA 10 in place. Typically, hinges 24 and 26 are set to equal angles to align post 30 in an upright position relative to the plane defined by feet 12 and 14, however, differential adjustment of these hinges also provides the opportunity to vary the tilt (roll) of the PDA.

Figure 2A:
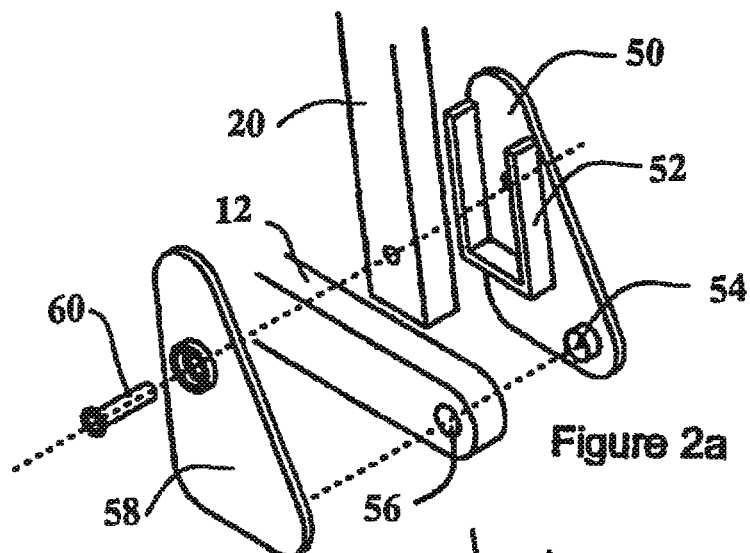
FIG. 2a shows an exploded view and FIG. 2b shows an assembled view of nodes 16 and 18 of FIG. 1.
Figure 2B:
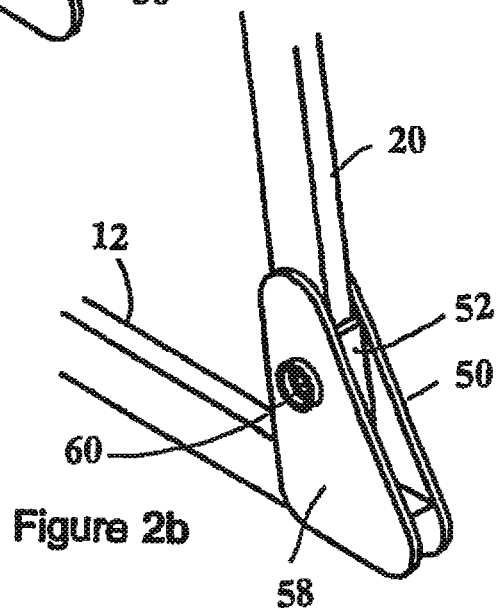

FIG. 2a shows an exploded view of a foot-leg hinge embodiment corresponding to nodes 16 and 18 of FIG. 1. FIG. 2b shows the completed hinge of FIG. 2a. Hinge cover 50 includes a U-shaped feature 52 that functions as a stop for foot 12 and also captures leg 20 to maintain the angular displacement described with respect to FIG. 1. Hinge cover 50 further includes boss 54 that engages hole 56 of foot 12 to define the axis of foot rotation described with respect to FIG. 1. Hinge cover 58 is a reverse image of hinge cover 50 including features 52 and 54. Rivet 60 passes through hinge cover 58, leg 20 and hinge cover 50 to complete the assembly as shown in FIG. 2b.

Figure 3:
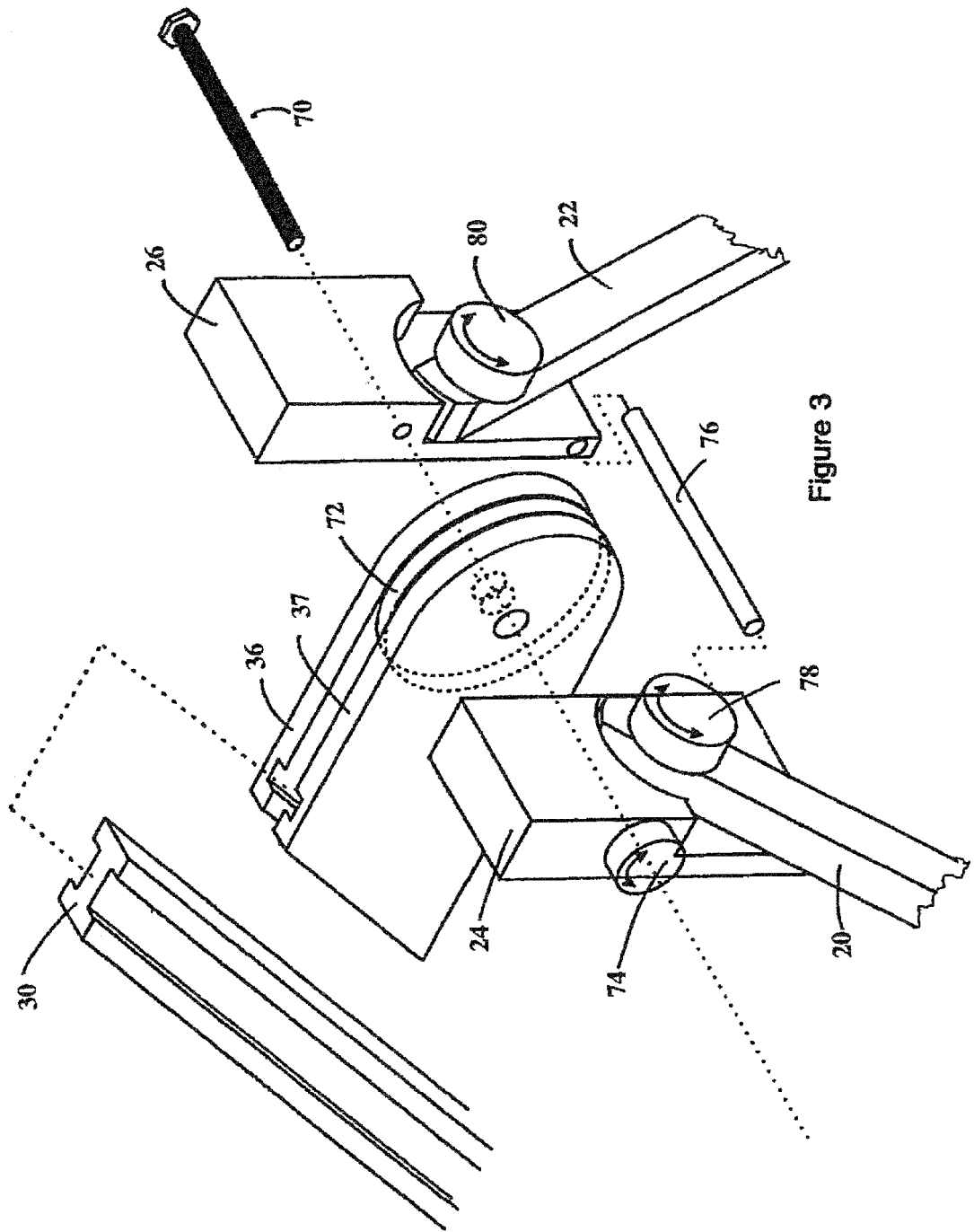
FIG. 3 shows an exploded view of a structure for coupling post 30 to legs 20 and 22 of FIG. 1.

FIG. 3 shows an exploded view of an embodiment of structure coupling post 30 to legs 20 and 22 of FIG. 1. Post 30 is insertable into the jaws of elements 36 and 37 that function as tongs to grasp post 30 at a user elected position along its length. Transverse compression bolt 70 threads through hinge plate 26, element 36, spacer 72, element 37, hinge plate 24 and transverse compression knob 74. The hexagonal head of bolt 70 is recessed into the body of hinge plate 26 to prevent rotation. Linking pin 76 together with compression bolt 70 aligns hinge plates 24 and 26 to a common plane while allowing the intervening structure to rotate about the axis of bolt 70. Clockwise rotation of transverse compression knob 74 gradually increases compression on tongs 36 and 37 to first grasp post 30 thereby setting the degree of elevation for PDA 10. As compression is further increased, rotation of post 30 becomes increasingly resistant to rotation until it is securely locked thereby setting the pitch of PDA 10. Leg compression knobs 78 and 80 are threaded onto leg compression bolts (not shown) to frictionally engage legs 20 and 22 with hinge plates 24 and 26 respectively in the manner described with respect to knob 74. Knobs 74, 78 and 80 provide continuously variable compression allowing the user to elect the preferred degree of compression for setup and use. It is sufficient, if not preferable, to predetermine these two levels of compression. A cam lever akin to cam lever 124 of FIG. 4, when combined with an axial spring, can provide a setup level of compression when the lever is in the unlocked position and a locked level of compression when the cam lever is in the locked position.

Figure 4:
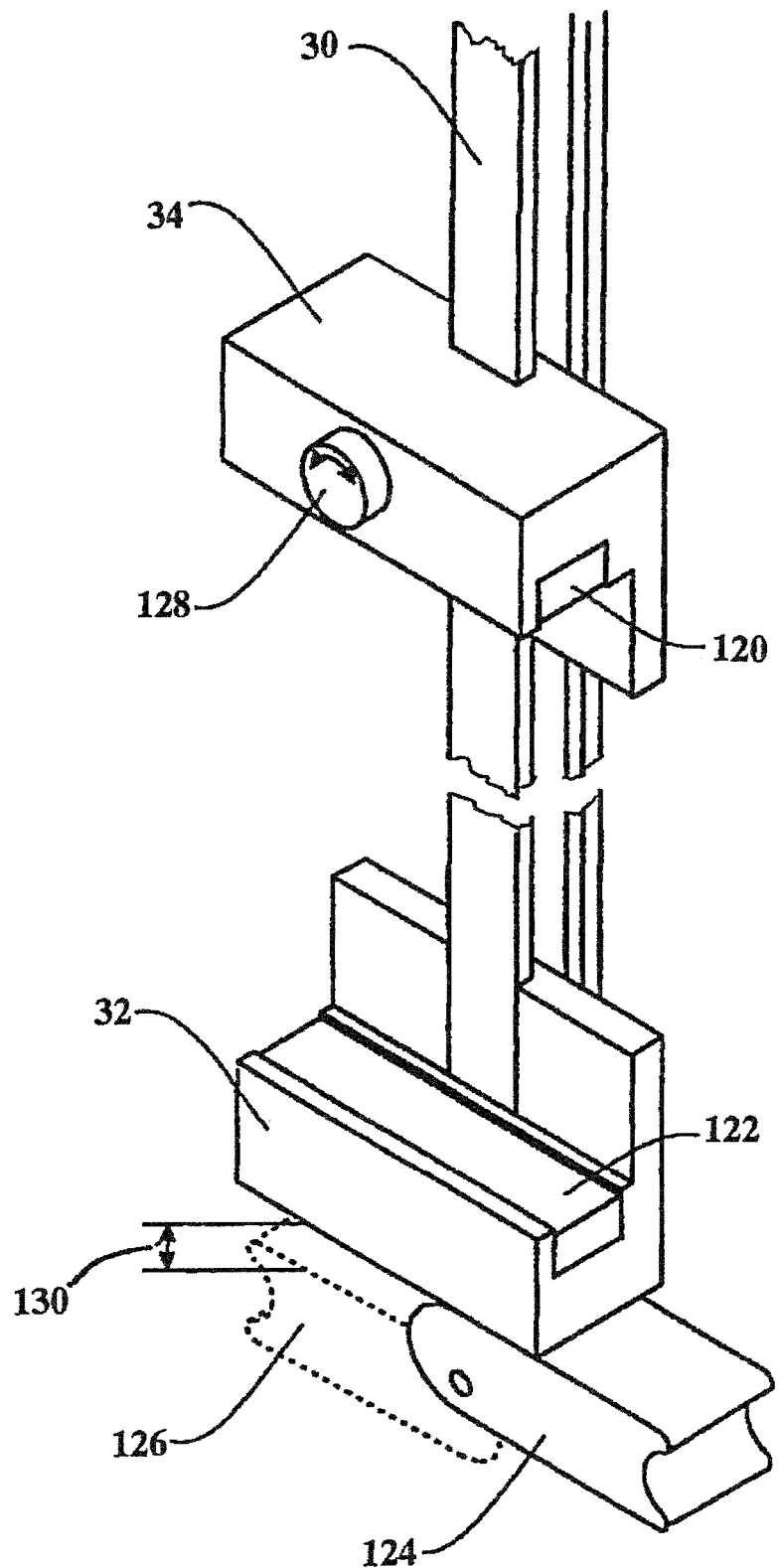
FIG. 4 shows the structural details of tablet holding jaws 32 and 34 of FIG. 1.

FIG. 4 shows the structural details of jaws 32 and 34 of FIG. 1 that couple PDA 10 to post 30. Both jaws are captive to, and moveable along, the edge of post 30 to accommodate PDAs of varying height. Each jaw includes a resilient pad 120 and 122 to provide a deformable interface with PDA 10. This deformation is accomplished by eccentric cam lever 124 shown in the locked position. Dashed lines 126 indicate the unlocked position of lever 124. While in the unlocked position, and with the bottom edge of PDA 10 resting on jaw 32, jaw 34 is adjusted to bring pad 120 in contact with the top edge of PDA 10. Knob 128 is coupled to a bolt (not shown) threaded into jaw 34 such that clockwise rotation of knob 128 forces said bolt into the front face of post 30 to lock jaw 34 in place. Moving lever 124 from the unlocked to the locked position creates a vertical displacement of jaw 32 as indicated by line 130 thus deforming resilient pads 120 and 122 to secure PDA 10 in place.

Figure 5:
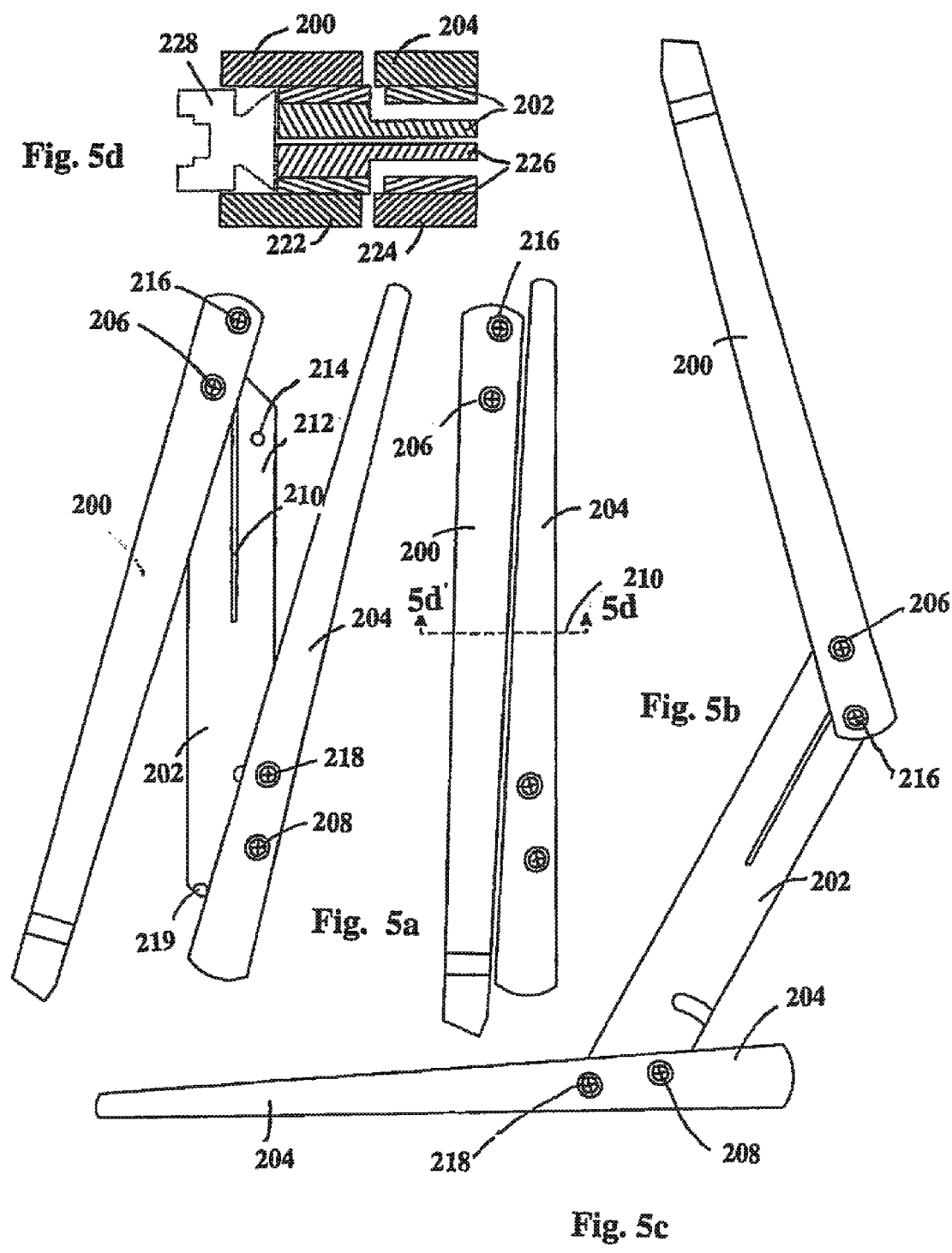
FIG. 5a shows an alternative embodiment of certain erectable beams of FIG. 1 in a partially open state.
FIG. 5b shows the alternative embodiment in its fully collapsed state.
FIG. 5c shows the alternative embodiment in its erect state.
FIG. 5d shows a cross sectioned view taken along line 5d-5d in FIG. 5b.

FIGS. 5-5d show an alternative embodiment of certain erectable beams of FIG. 1. FIG. 5a shows arm 200, body 202 and foot 204 in a partially opened state. Pivot screw 206 allows arm 200 to rotate about one end of body 202 while pivot screw 208 allows foot 204 to rotate about the opposite end of body 202 so that these elements may be configured by the user to a collapsed state for storage or to a predetermined erect state for use. Each pivot screw requires additional structure to form a coupling node capable of sustaining the structure of FIG. 5 in an erect state. With respect to pivot screw 206, slit 210 isolates a portion of body 202 to form a flexible beam 212 containing latching hole 214 that functions to capture a cylindrical detent 236 (FIG. 6) associated with detent screw 216 when arm 200 is rotated clockwise when viewed in FIG. 5a. Elements 206, 210, 212, 214 and 216 thus comprise a node to couple arm 200 to body 202.

Figure 6:
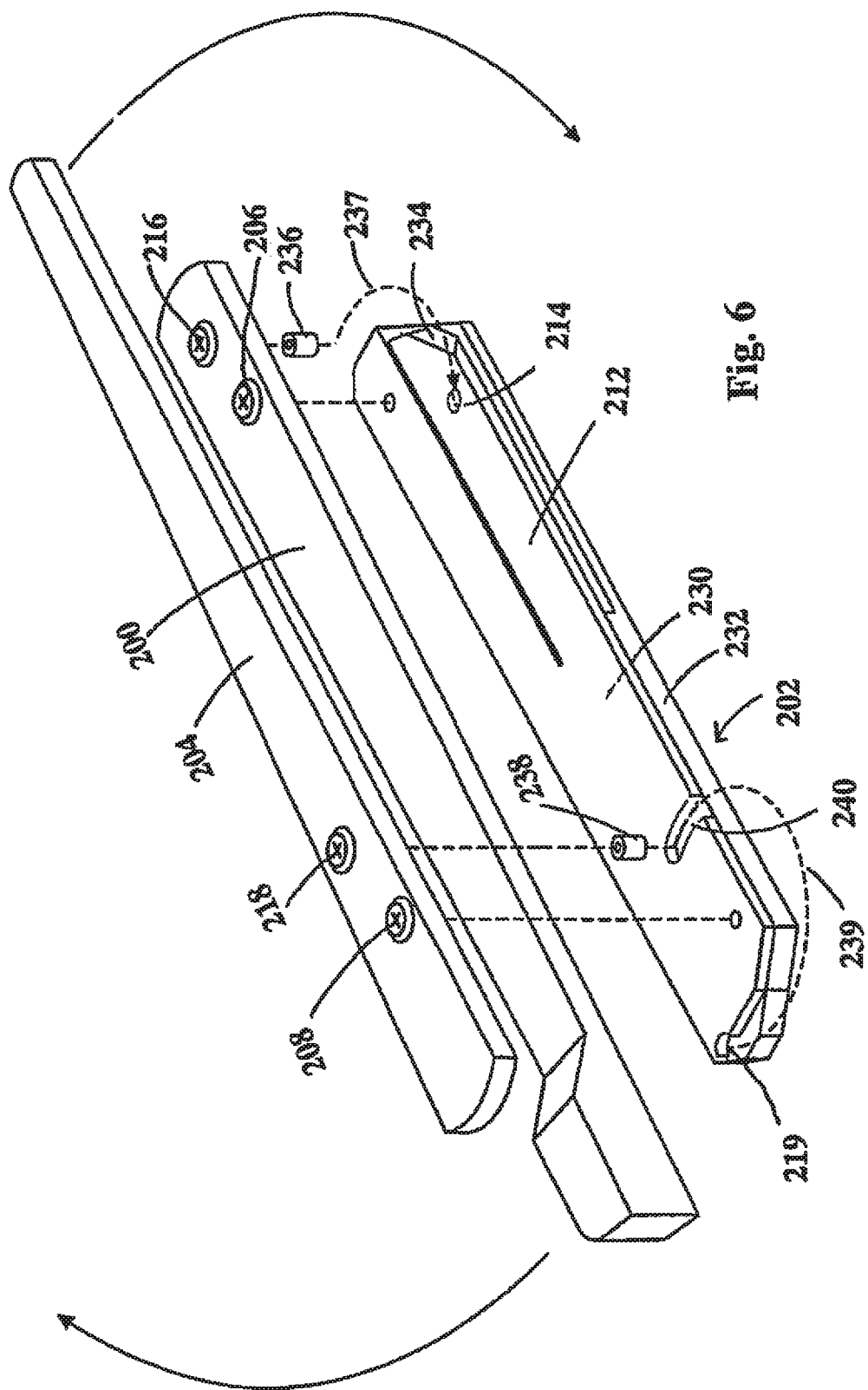
FIG. 6 is an exploded isometric view of the beam elements of FIGS. 5b and 5c.

A more detailed discussion of coupling is provided with respect to FIG. 6. With respect to pivot screw 208, the coupling node is completed by detent screw 218, its associated cylindrical detent 238, and stop 219. FIG. 5b shows the collapsed state of the erectable beams while FIG. 5d shows an enlarged cross-sectional view of FIG. 5b as indicated by sectioning line 210. FIG. 5d also show the opposing set of beam elements 222, 224 and 226 that mirror those indicated in FIG. 5b to complete a collapsed bipod structure. Post 228 has been added in phantom to show the collocation of all erectable beams when in the collapsed state. The articulation required to place post 228 in this position is described with respect to FIG. 7. FIG. 5c shows the predetermined erect configuration of arm 200, body 202 and foot 204.

FIG. 6 is an isometric view of the beam elements of FIGS. 5a-5d. It has been vertically exploded to provide additional detail regarding the aforementioned coupling nodes. Body 202 is a laminate structure comprised of a top layer 230 containing coupling node features and a bottom layer 232 containing a cavity allowing for flexure of beam 212 when squeezed. This lamination creates the substantially rigid structure necessary to achieve a predetermined erect configuration. As arm 200 rotates clockwise detent 236 moves in the orbit indicated by line 237, downwardly deflecting beam 212 as it contacts ramp 234, until detent 236 is captured by hole 214. While in this latched condition, arm 200 is able to withstand the load presented by the mounted PDA. The collapsed state is restored by downward pressure on beam 212 releasing detent 236 to allow counter rotation. In this exploded view, foot 204 has been elevated above arm 200 to more clearly show the elements of its coupling node. As foot 204 rotates in a clockwise direction, detent 238 moves in the orbit indicated by line 239 from arcuate cavity 240 to stop 219. Stop 219 satisfies the conditions necessary to achieve a static erect configuration in that detent 238 is held in contact with stop 219 by the load of the mounted PDA while in the erect configuration yet is free to counter rotate to the collapsed configuration.

Figures 7A, 7B, 8:
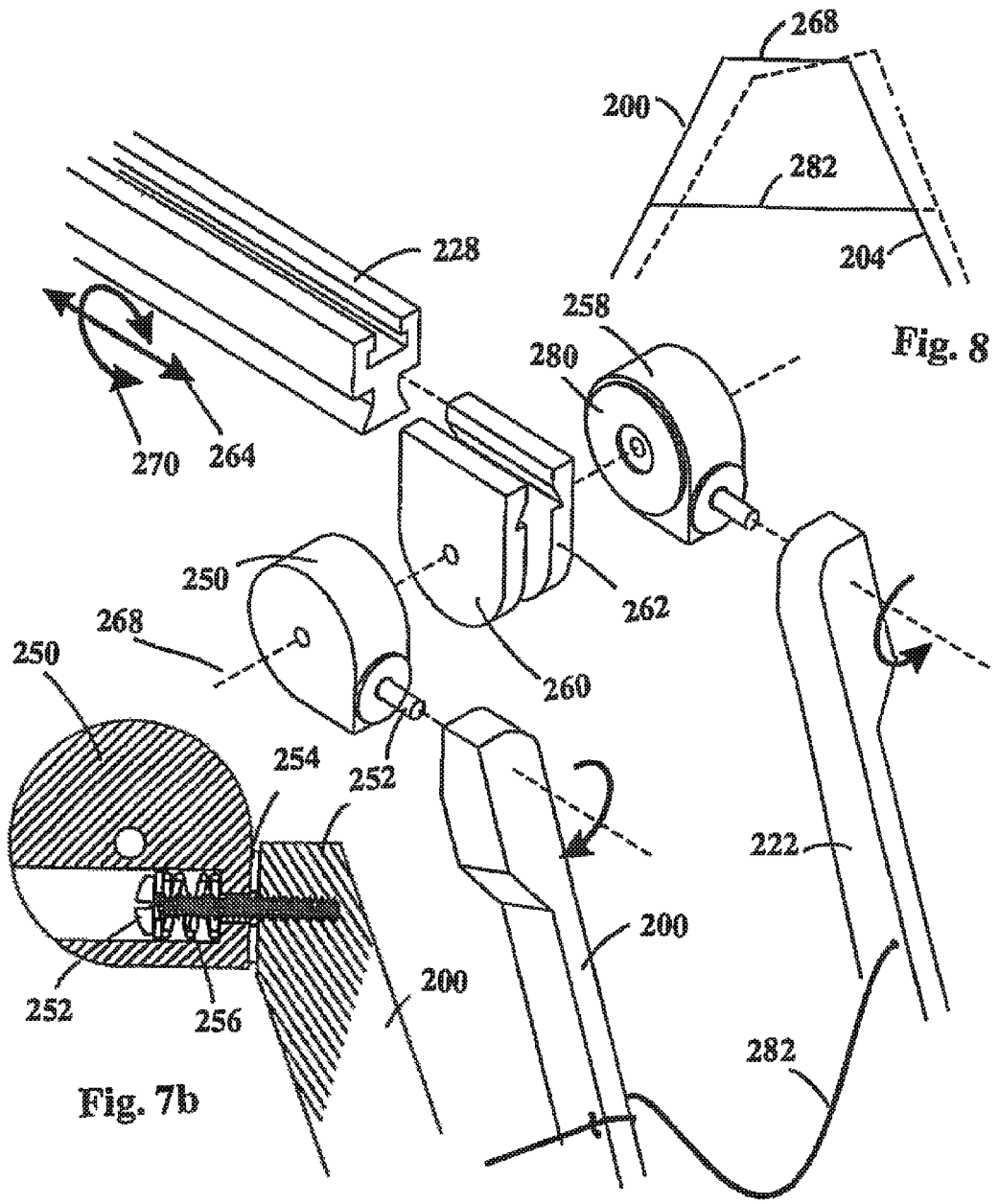
FIGS. 7a-7b show the complex of coupling nodes for joining arms 200 and 222 to post 228.
FIG. 8 is a schematic illustration showing the response of the bipod mount to the application of torque to its mounting post.

FIG. 7a shows the complex of coupling nodes joining arms 200 and 222 to post 228. A PDA (not shown) is mounted to post 228 in the manner described with respect to FIGS. 1 and 4. FIG. 7b is a cross-sectional view illustrating the coupling node associated with arm 200 and a compression hub 250. Bolt 252 is secured to arm 200 providing a pivot axis for compression hub 250. A cork disk 254 may be affixed to hub 250 to enhance the rotational friction of this node. Compression spring 256 is chosen to provide a predetermined compressive force sufficient to maintain a stable rotational position while in an erect configuration, yet low enough to allow the rotation required to move between the collapsed configuration and the erect configuration. An identical coupling node joins arm 222 to compression hub 258. Compression of rotatable jaws 260 and 262 along axis 268 is adjustable in the manner described with respect to FIG. 3. While in low axial compression, post 228 is translatable through jaws 260 and 262 as indicated by straight double arrow line 264 and rotatable about axis 268 as indicated by curved double arrow line 270. These two degrees of freedom allow the height and pitch of the mounted PDA to be simultaneously set with a single compressive adjustment. Cork disks 280 are affixed to the inner surfaces of compression hubs 250 and 58 to provide sufficient rotational friction to support the weight of the subject PDA. Adjustable cord 282 sets the maximum splay of arms 200 and 222 in the erect configuration.

FIG. 8 is diagram illustrating the response of the structure to torque of post 228 to provide a third degree of freedom for adjustment. The solid line indicates the position of arms 200 and 222 relative to axis 268 while in a balanced state maintained by the rotational friction associated with their respective coupling nodes. The dashed line indicates the tilt of axis 268 in response to a user generated torque of post 228 sufficient to overcome this friction. The ability to adjust height, pitch and tilt relative to a complex of nodes fixed in space by a collapsible structure having a predetermined erect configuration is a reconciliation of functionality with usability not found in the prior art.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

What is claimed is:

1. An apparatus for supporting and positioning a tablet computer relative to a user comprising:
    (a) a rigid post having positionable clamp members mounted thereon adapted to engage upper and lower edges of a tablet computer;
    (b) a pair of arm members having first and second ends;

(c) a pair of foot members individually coupled to the air of arm members by intermediate body members;

(d) first detent members operatively disposed between the pair of arm members and associated body members;

(e) a pair of friction hubs individually secured to the first ends of the pair of arm members and whereby the arm members can be made to swivel with respect to its friction hub;

(f) clamping means disposed between the pair of friction hubs, the clamping means engaging the rigid posts and the pair of friction hubs; and (g) an axial compression rod cooperating with the pair of friction hubs for adjusting a compression force exerted on the rigid post and the ability of the rigid post to be swiveled with respect to the pair of friction hubs.

2. The apparatus of claim 1 wherein the pair of foot members are individually coupled to the second ends of the pair of arm members.

3. The apparatus of claim 2 wherein the pair of foot members are pivotally affixed to the second ends of the pair of arm members.

4. The apparatus of claim 1 wherein adjustment of the compression force exerted on the rigid post allows for translation of the rigid post with respect to the clamping means and selective locking of the rigid post with respect to the clamping means.

5. The apparatus of claim 1 wherein adjustment of the compression force allows for rotation of the clamping means with respect to the pair of friction hubs and selective locking of the clamping means with respect to the pair of friction hubs.

6. The apparatus of claim 1 and further including second detent members operatively disposed between the pair of foot members and associated body members.

7. The apparatus as in claim 1 wherein the intermediate body members comprise a laminated pair of planar substrates, a first of the pair including a cavity and a second of the pair including a resilient beam portion overlaying the cavity in the first of the pair and with an aperture formed in the resilient beam for receiving the first detent member therein.

8. The apparatus of claim 1 wherein the intermediate body members each comprise a laminated pair of planar substrates, a first of the pair including an arcuate slot and notch in an end portion thereof wherein the second detent member travels from the arcuate slot to the notch upon rotation of the foot members with respect to its associated body member.

9. The apparatus of claim 1 wherein the pair of friction hubs are individually secured to the first ends of the pair of arm members by screws and compression springs surrounding the screws whereby the friction force between the pair of friction hubs and the first ends of the pair of arm members is adjustable.

\* \* \* \* \*

UNITED STATES PATENT AND TRADEMARK OFFICE
CERTIFICATE OF CORRECTION

| | | |
|---|---|---|
| PATENT NO. | : 9,027,900 B2 | Page 1 of 1 |
| APPLICATION NO. | : 14/153200 | |
| DATED | : May 12, 2015 | |
| INVENTOR(S) | : Thomas R. Prohofsky et al. | |

It is certified that error appears in the above-identified patent and that said Letters Patent is hereby corrected as shown below:

In The Claims

In claim 1(c), column 7, line 1, replace the word "air" with the word "pair".

Signed and Sealed this
Eleventh Day of August, 2015

Michelle K. Lee
*Director of the United States Patent and Trademark Office*